(12) United States Patent
Jin

(10) Patent No.: US 7,845,481 B2
(45) Date of Patent: Dec. 7, 2010

(54) CLUTCH MASTER CYLINDER AND CLUTCH OPERATING SYSTEM OF VEHICLE

(75) Inventor: Do Hyun Jin, Incheon (KR)

(73) Assignee: Kia Motors Corporation, Seoul (KR)

( * ) Notice: Subject to any disclaimer, the term of this patent is extended or adjusted under 35 U.S.C. 154(b) by 542 days.

(21) Appl. No.: 11/796,634

(22) Filed: Apr. 27, 2007

(65) Prior Publication Data
US 2008/0142326 A1 Jun. 19, 2008

(30) Foreign Application Priority Data
Dec. 14, 2006 (KR) .................. 10-2006-0128115

(51) Int. Cl.
*F16D 25/08* (2006.01)
(52) U.S. Cl. ...................... 192/85.6; 60/478
(58) Field of Classification Search ............ 92/152; 192/85.55, 85.6
See application file for complete search history.

(56) References Cited

U.S. PATENT DOCUMENTS 2,101,772 A * 12/1937 Baughn .................. 60/578
3,291,350 A * 12/1966 Malec .................... 222/318
5,127,506 A * 7/1992 Muller et al. ........... 192/85 C

FOREIGN PATENT DOCUMENTS

KR  10-2000-0058571  10/2000

* cited by examiner

*Primary Examiner*—David D Le
*Assistant Examiner*—Ryan Dodd
(74) *Attorney, Agent, or Firm*—Morgan, Lewis & Bockius LLP

(57) ABSTRACT

A clutch operating system includes a clutch pedal; a clutch master cylinder that generates hydraulic pressure by operation of the clutch pedal; a clutch release cylinder that operates the clutch by the hydraulic pressure; and a clutch fluid reservoir that stores fluid. The clutch master cylinder includes a cylinder with a wide section, an intermediate section, and a narrow section; a piston in the cylinder, with an intermediate section that fits in the intermediate cylinder section, and a narrow section that fits in the narrow cylinder section; a reservoir fluid line fluidly communicating the clutch fluid reservoir and the clutch master cylinder; an operating fluid line fluidly communicating the clutch release cylinder and the clutch master cylinder; a return spring providing a restoring force to the piston; and a piston rod that delivers movement of a clutch pedal to the piston.

18 Claims, 3 Drawing Sheets

CLUTCH MASTER CYLINDER AND CLUTCH OPERATING SYSTEM OF VEHICLE

CROSS-REFERENCE TO RELATED APPLICATION

This application claims priority to, and the benefit of, Korean Patent Application No. 10-2006-0128115, filed in the Korean Intellectual Property Office on Dec. 14, 2006, the entire contents of which are incorporated herein by reference.

BACKGROUND OF THE INVENTION (a) Field of the Invention

The present invention relates to a clutch master cylinder and a clutch operating system of a vehicle.

(b) Description of the Related Art

Typically, when a driver depresses a clutch pedal, the hydraulic pressure generated in a clutch master cylinder is delivered to a clutch release cylinder, which operates the clutch with the hydraulic pressure. The higher the ratio of the cross-sectional area of the clutch release cylinder to the cross-sectional area of the clutch master cylinder, the smaller the pedal stroke (the movement of the clutch pedal in order to operate the clutch), and the higher the pedal force (the force felt by the driver from the clutch pedal).

Recently, output power of engines has increased, increasing the load on the clutch. Therefore, a higher capacity clutch is required. When a conventional clutch operating system is used for such a higher capacity clutch, the pedal force is high, increasing driver fatigue. Therefore, a system with reduced pedal force for a high power engine would be desirable.

While simply reducing the interior diameter of the clutch master cylinder would reduce the pedal force, it would increase the pedal stroke, causing the driver to have to move his foot a great distance.

The above information disclosed in this Background section is only for enhancement of understanding of the background of the invention and therefore it may contain information that does not form the prior art that is already known in this country to a person of ordinary skill in the art.

SUMMARY OF THE INVENTION

A clutch operating system, for operating a clutch that controls power delivery between an engine and a transmission, includes a clutch pedal; a clutch master cylinder that generates hydraulic pressure by operation of the clutch pedal; a clutch release cylinder that operates the clutch by the hydraulic pressure; and a clutch fluid reservoir that stores fluid. The clutch master cylinder includes a cylinder with a wide section, an intermediate section, and a narrow section; a piston in the cylinder, with an intermediate section that fits in the intermediate cylinder section, and a narrow section that fits in the narrow cylinder section; a reservoir fluid line providing fluid communication between the clutch fluid reservoir and the clutch master cylinder; an operating fluid line providing fluid communication between the clutch release cylinder and the clutch master cylinder; a return spring providing a restoring force to the piston; and a piston rod that delivers a movement of a clutch pedal to the piston.

A primary hydraulic pressure is formed by contact between the intermediate piston section and the intermediate cylinder section during movement of the piston. A secondary hydraulic pressure is formed by contact between the narrow piston section and the narrow cylinder section during further movement of the piston. The secondary hydraulic pressure is larger than the primary hydraulic pressure.

The wide cylinder section is closest to the piston rod, and the narrow cylinder section is closest to the operating fluid line.

The return spring is disposed in the wide cylinder section.

Several indentations are provided at an exterior surface of the piston.

DETAILED DESCRIPTION OF THE PREFERRED EMBODIMENTS

An exemplary embodiment of the present invention will hereinafter be described in detail with reference to the accompanying drawings.

Figure 1:
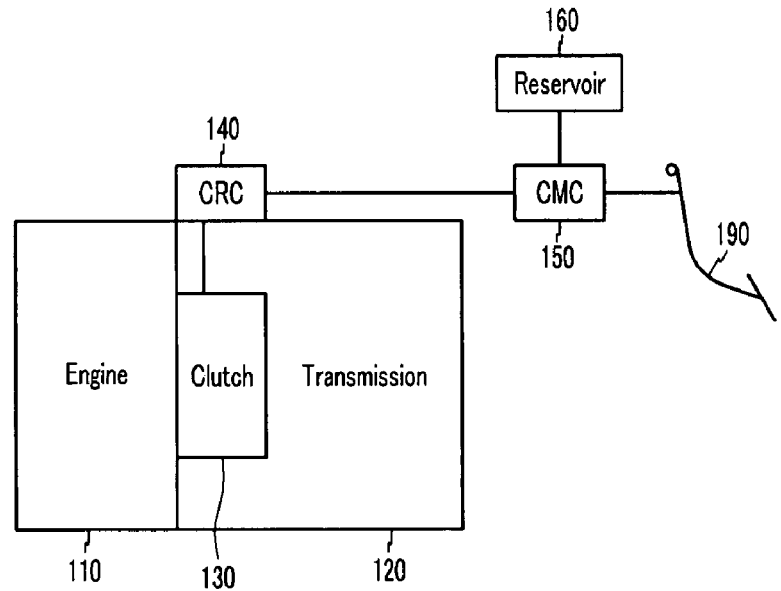
FIG. 1 is a schematic diagram of a clutch operating system of a vehicle according to an exemplary embodiment of the present invention.

As shown in FIG. 1, a clutch operating system 100 according to an exemplary embodiment of the present invention includes a clutch pedal 190, a clutch master cylinder 150, a clutch release cylinder 140, and a clutch fluid reservoir 160. The clutch pedal 190 operates a clutch 130 that controls power delivery between an engine 110 and a transmission 120. The clutch master cylinder 150 generates hydraulic pressure by operation of the clutch pedal 190. The clutch release cylinder 140 operates the clutch 130 by the hydraulic pressure of the clutch master cylinder 150. The clutch fluid reservoir 160 stores a fluid used in the clutch operating system 100.

A clutch master cylinder 150 according to an exemplary embodiment of the present invention will now be described.

Figure 2:
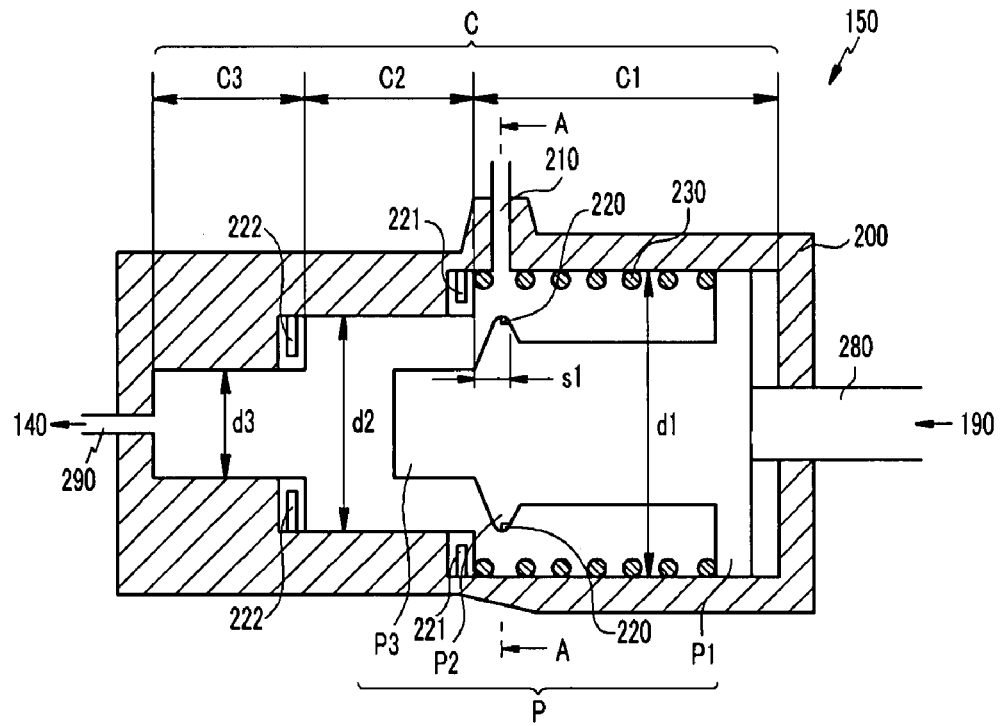
FIG. 2 is a cross-sectional view showing a home position of a clutch master cylinder of a vehicle according to an exemplary embodiment of the present invention.

As shown in FIG. 2, the clutch master cylinder 150 according to an exemplary embodiment of the present invention includes a cylinder C in a body 200, and a piston P in the cylinder C. The cylinder C has a plurality of interior diameters, and the piston P has a plurality of exterior diameters.

In addition, the clutch master cylinder 150 may include a reservoir fluid line 210 that communicates with the fluid reservoir 160, an operating fluid line 290 that communicates with the clutch release cylinder 140, a return spring 230 that provides a restoring force to the piston P, and a piston rod 280 that delivers a movement of the clutch pedal 190 to the piston P.

In more detail, the cylinder C includes a large diameter cylinder section c1 with a large diameter d1, an intermediate diameter cylinder section c2 with an intermediate diameter d2, and a small diameter cylinder section c3 with a small diameter d3, such that the cylinder c has a stepped interior surface, with the large diameter cylinder section c1 closest to the piston rod 280 and the small diameter cylinder section c3 closest to the operating fluid line 290.

A first sealing member 221 is provided at an entrance of the intermediate diameter cylinder section c2. A second sealing member 222 is provided at an entrance of the small diameter cylinder section c3. The first and second sealing members 221 and 222 may be, for example, rubber sealing members that have cup-shaped cross-sections.

The piston P includes a large diameter piston section p1 with the large diameter d1, an intermediate diameter piston section c2 with the intermediate diameter d2, and a small diameter cylinder section c3 with the small diameter d3. That is, the large diameter piston section p1 fits in the large diameter cylinder section c1, the intermediate diameter piston section p2 fits in the intermediate diameter cylinder section c2, and the small diameter piston section p3 fits in the small diameter cylinder section c3.

The return spring 230 is located in the large diameter cylinder section c1, and applies an elastic force to the large diameter piston section p1 by being abutted by a step formed in the intermediate diameter cylinder section c2. Therefore, when the clutch pedal 190 is released after the piston P has moved to the left in FIG. 2 by the operation of the clutch pedal 190, the return spring 230 applies restoring force to the piston P, to the right in FIG. 2.

The clutch fluid reservoir 160 and the clutch master cylinder 150 are in fluid communication via the reservoir fluid line 210. The reservoir fluid line 210 may be provided in the large diameter cylinder section c1.

Figure 5:
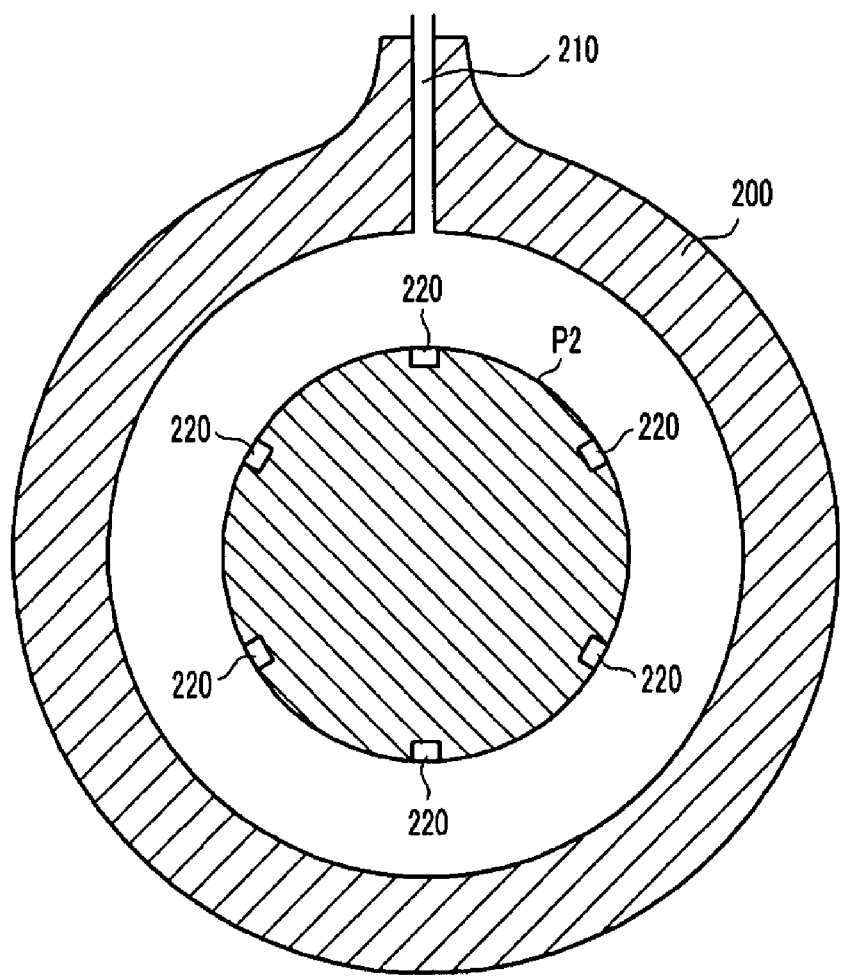
FIG. 5 is a cross-sectional view taken along line A-A of FIG. 2.

An indentation 220 for holding the clutch fluid therein is provided on an exterior surface of the piston P. In more detail, as shown in FIG. 5, several indentations 220 are provided at various positions along the external surface of the intermediate diameter piston section p2. While six indentations 220 are shown in FIG. 5, it should be understood that the scope of the present invention is not limited thereto.

The indentations 220 allow the intermediate diameter piston section p2 to be lubricated. Therefore, the piston P may smoothly move at an abrupt operation of the clutch pedal 190. Consequently, clutch pedal noise is minimized.

Hereinafter, an operation of the clutch master cylinder 150 according to an exemplary embodiment of the present invention is described in detail with reference to FIG. 2 to FIG. 4.

The large diameter piston section p1 of the piston P tightly fits in the large diameter cylinder section c1 of the cylinder C. When a driver presses the clutch pedal 190, force is delivered to the piston P through the piston rod 280, and thus the piston P moves to the left in FIG. 2. A first distance s1 is an idle distance that provides play of the piston movement.

Figure 3:
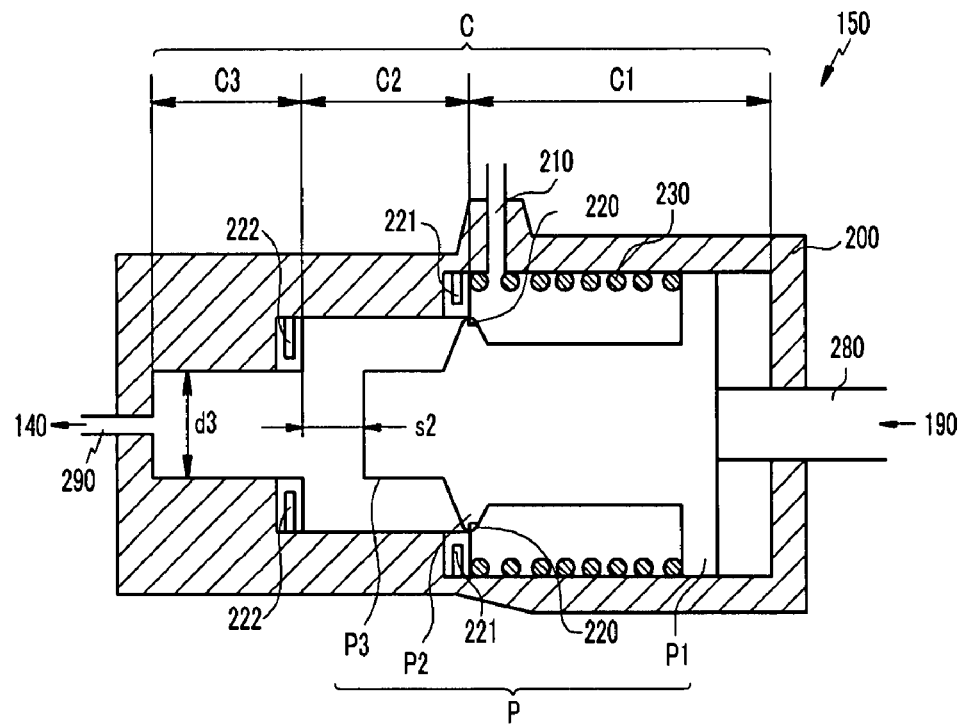
FIG. 3 is a cross-sectional view showing a clutch master cylinder of a vehicle according to an exemplary embodiment of the present invention that generates a primary hydraulic pressure.

After the piston P moves the first distance s1, the piston P is located as shown in FIG. 3. As shown in FIG. 3, when the piston P moves to the left by the idle distance s1, the intermediate diameter piston section p2 contacts the intermediate diameter cylinder section c2. Therefore, the intermediate diameter cylinder section c2 is covered by the intermediate diameter piston section p2, and accordingly, a primary pressure is formed. Since the first sealing member 221 is located at the entrance of the intermediate diameter cylinder section c2, the primary pressure is uniform. While the piston P2 further moves to the left in the drawing, the primary pressure is maintained.

The amount of primary pressure can be found by dividing the driver's pressing force delivered through the piston rod 280 by the cross-sectional area of the intermediate diameter cylinder section c2. The primary pressure is delivered to the clutch release cylinder 140 through the operating fluid line 290, and the clutch release cylinder 140 operates by the primary pressure.

The generation of the primary pressure and the delivery thereof to the clutch release cylinder 140 is maintained while the piston P moves by a second distance s2.

Figure 4:
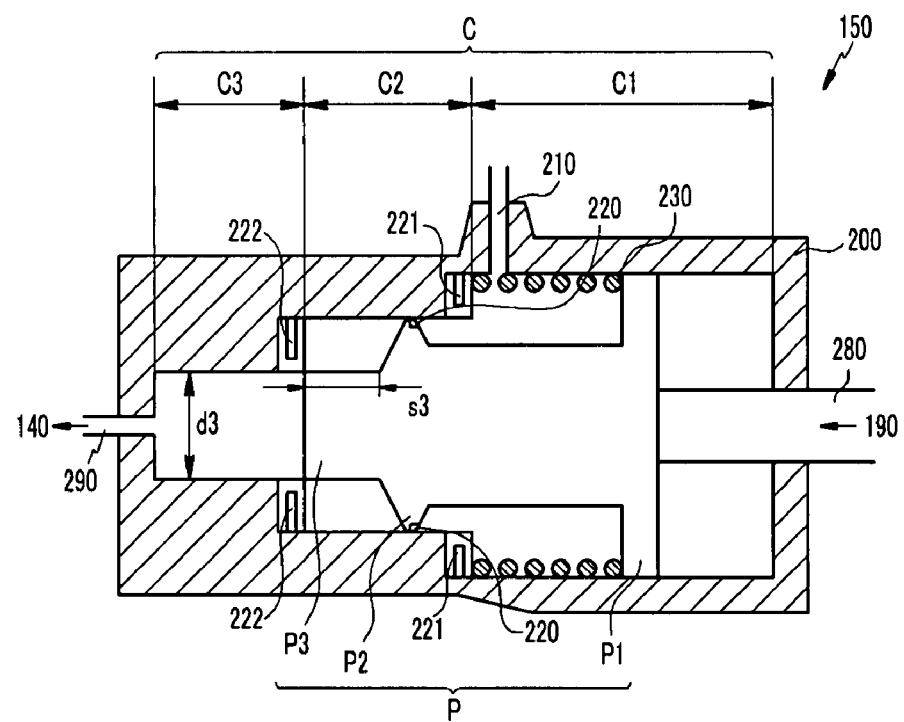
FIG. 4 is a cross-sectional view showing a clutch master cylinder of a vehicle according to an exemplary embodiment of the present invention that generates a secondary hydraulic pressure.

FIG. 4 shows a state where the piston P has moved by the second distance s2 from the state shown in FIG. 3. As shown in FIG. 4, when the piston P has moved by the second distance s2 from the state shown in FIG. 3, the small diameter piston section p3 is fitted in the small diameter cylinder section c3, providing a secondary pressure. Since the second sealing member 222 is located at the entrance of the small diameter cylinder section c3, the secondary pressure is uniform. While the piston P2 moves further to the left in the drawing, the secondary pressure is maintained.

The amount of secondary pressure can be found by dividing the driver's pressing force delivered through the piston rod 280 by the cross-sectional area of the small diameter cylinder section c3; therefore, the secondary pressure is larger than the primary pressure. The secondary pressure is delivered to the clutch release cylinder 140 through the operating fluid line 290, and the clutch release cylinder 140 operates by the secondary pressure.

The generation of the secondary pressure and the delivery thereof to the clutch release cylinder 140 is maintained while the piston P moves by a third distance s3. That is, the clutch release cylinder 140 can be operated by the secondary pressure while the piston moves by the third distance s3.

The primary and secondary pressures may be utilized in various ways by designing axial direction lengths of the intermediate diameter cylinder section c2 and the small diameter cylinder section c3. For example, the axial lengths of the sections c2 and c3 may be designed such that the primary pressure is used for an initial movement of the clutch release cylinder 140 that requires relatively small force, and the secondary pressure is used for a movement range of the clutch release cylinder 140 that requires relatively high force.

In this case, a driver may not feel a substantial difference in the pedal force throughout an entire pedal stroke. Also, a driver can easily operate a high-capacity clutch for a high power engine, by utilizing the secondary pressure in controlling the clutch.

Dimensions and other design specifications of the intermediate diameter cylinder section c2 and the small diameter cylinder section c3 may be selected by a person of ordinary skill in the art based on the teachings herein.

According to an exemplary embodiment of the present invention, a clutch pedal operation is stable. In addition, the pedal force felt by a driver is reduced in a range where a reaction force of the clutch operation is large, and accordingly the clutch operation is easier without causing a significant increase of the pedal stroke. Furthermore, an overall pedal force felt by a driver required for operating a high capacity clutch for a high power engine is reduced. Therefore, a driver can easily operate a high-capacity clutch in a high power engine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clutch master cylinder, comprising:
   a cylinder comprising a wide cylinder section, an intermediate cylinder section, and a narrow cylinder section;
   a piston disposed in the cylinder and comprising a wide piston section that sealingly fits in the wide cylinder section, an intermediate piston section that sealingly fits in the intermediate cylinder section and a narrow piston section that sealingly fits in the narrow cylinder section;

a reservoir fluid line formed in the wide cylinder section and providing a first fluid communication between a fluid reservoir and the clutch master cylinder;

an operating fluid line providing a second fluid communication between a clutch release cylinder and the clutch master cylinder;

a return spring providing a restoring force to the piston; and a piston rod that delivers a movement of a clutch pedal to the piston.

2. The clutch master cylinder of claim 1, wherein a primary hydraulic pressure is formed by a contact between the intermediate piston section and the intermediate cylinder section during a movement of the piston.

3. The clutch master cylinder of claim 2, wherein a secondary hydraulic pressure is formed by a contact between the narrow piston section and the narrow cylinder section during a further movement of the piston.

4. The clutch master cylinder of claim 3, wherein the secondary hydraulic pressure is larger than the primary hydraulic pressure.

5. The clutch master cylinder of claim 1, wherein the wide cylinder section is closest to the piston rod, and the narrow cylinder section is closest to the operating fluid line.

6. The clutch master cylinder of claim 1, wherein the return spring is disposed in the wide cylinder section.

7. The clutch master cylinder of claim 1, further comprising an indentation at an exterior surface of the piston to allow fluid communication therethrough in an axial direction of the piston.

8. The clutch operating system of claim 1, further comprising a plurality of indentations formed at an exterior surface of the piston to allow fluid communication therethrough in an axial direction of the piston.

9. The clutch operating system of claim 1, wherein a longitudinal length of the wide cylinder section is larger than the length between a distal end of the intermediate piston section and a proximate end of the wide piston section such that the intermediate piston section and the narrow piston section are sequentially engaged to the intermediate cylinder section and the narrow cylinder section respectively.

10. A clutch operating system for operating a clutch that controls power delivery between an engine and a transmission, the clutch operating system comprising:

a clutch pedal;

a clutch master cylinder that generates a hydraulic pressure by an operation of the clutch pedal;

a clutch release cylinder that operates the clutch by the hydraulic pressure; and a clutch fluid reservoir that stores a fluid;

wherein the clutch master cylinder comprises:

a cylinder comprising a wide cylinder section, an intermediate cylinder section, and a narrow cylinder section;

a piston disposed in the cylinder and comprising a wide piston section that sealingly fits in the wide cylinder section, an intermediate piston section that sealingly fits in the intermediate cylinder section and a narrow piston section that sealingly fits in the narrow cylinder section;

a reservoir fluid line formed in the wide cylinder section and providing a first fluid communication between the clutch fluid reservoir and the clutch master cylinder;

an operating fluid line providing a second fluid communication between the clutch release cylinder and the clutch master cylinder;

a return spring providing a restoring force to the piston; and a piston rod that delivers a movement of a clutch pedal to the piston.

11. The clutch operating system of claim 10, wherein a primary hydraulic pressure is formed by a contact between the intermediate piston section and the intermediate cylinder section during a movement of the piston.

12. The clutch operating system of claim 11, wherein a secondary hydraulic pressure is formed by a contact between the narrow piston section and the narrow cylinder section during a further movement of the piston.

13. The clutch operating system of claim 12, wherein the secondary hydraulic pressure is larger than the primary hydraulic pressure.

14. The clutch operating system of claim 10, wherein the wide cylinder section is closest to the piston rod, and the narrow cylinder section is closest to the operating fluid line.

15. The clutch operating system of claim 10, wherein the return spring is disposed in the wide cylinder section.

16. The clutch operating system of claim 10, further comprising an indentation at an exterior surface of the piston to allow fluid communication therethrough in an axial direction of the piston.

17. The clutch operating system of claim 10, further comprising a plurality of indentations formed at an exterior surface of the piston to allow fluid communication therethrough in an axial direction of the piston.

18. The clutch operating system of claim 10, wherein a longitudinal length of the wide cylinder section is larger than the length between a distal end of the intermediate piston section and a proximate end of the wide piston section such that the intermediate piston section and the narrow piston section are sequentially engaged to the intermediate cylinder section and the narrow cylinder section respectively.

* * * * *